May 31, 1938.  I. M. STEIN ET AL  2,119,061
CONTROL METHOD AND APPARATUS
Filed May 1, 1936  9 Sheets-Sheet 1
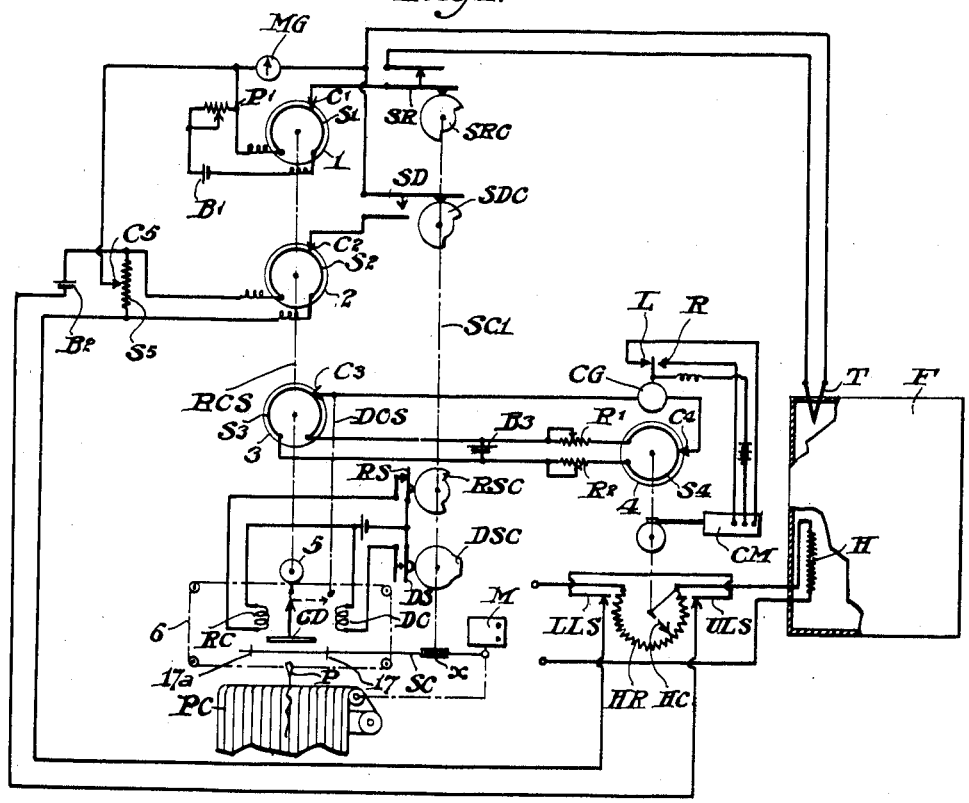
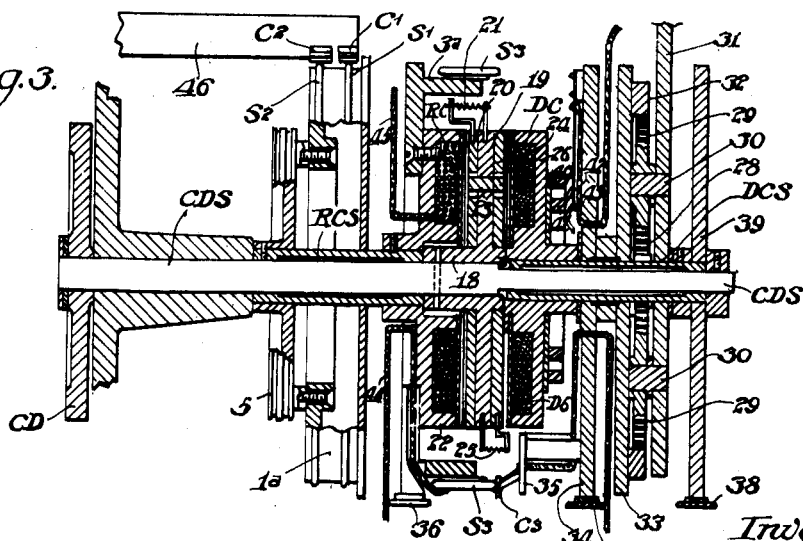

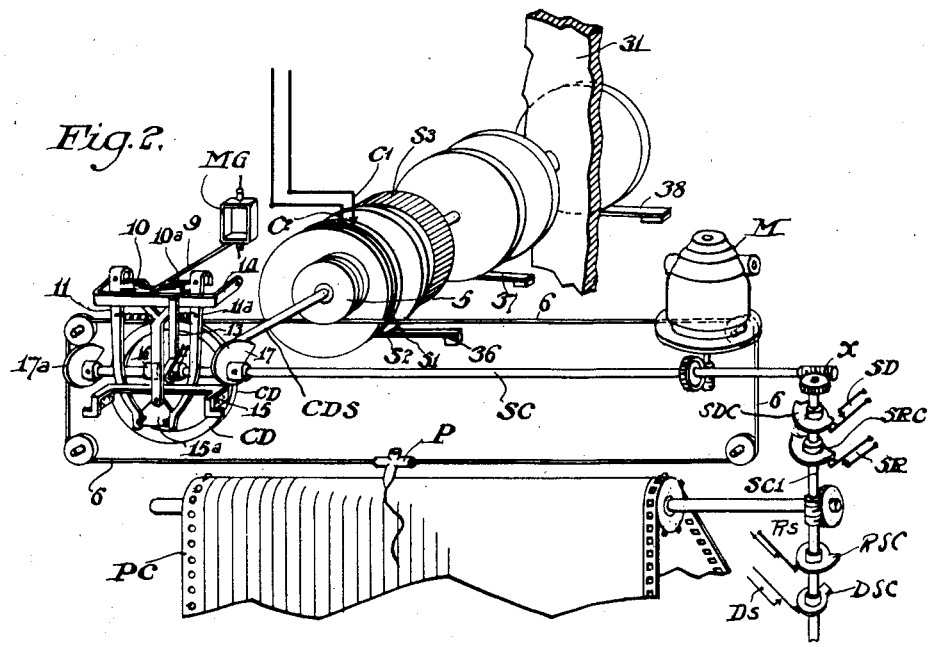
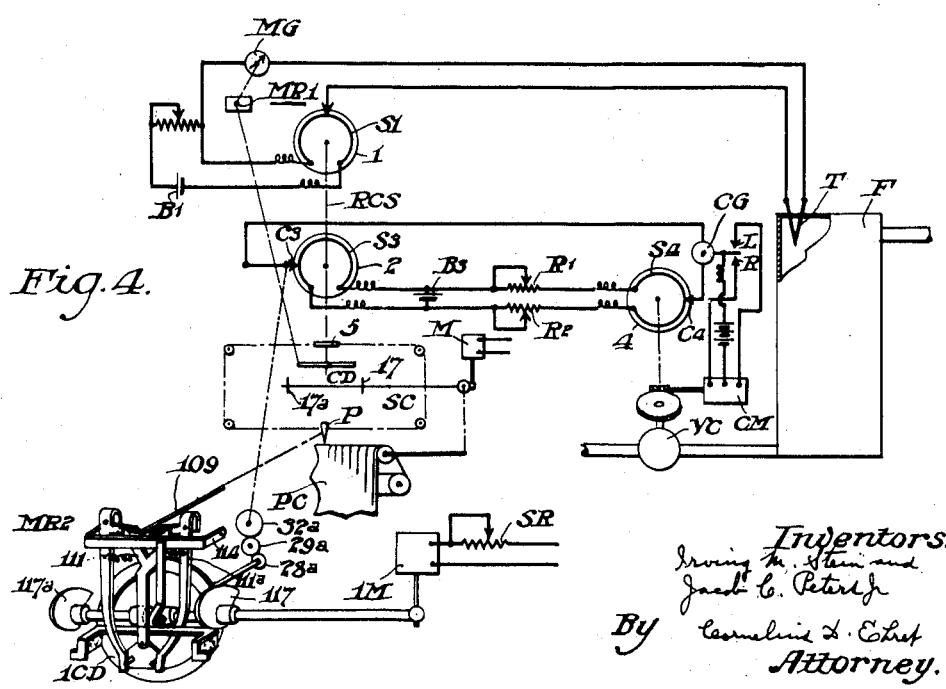

May 31, 1938.  I. M. STEIN ET AL  2,119,061
CONTROL METHOD AND APPARATUS
Filed May 1, 1936  9 Sheets-Sheet 3

Fig. 4ª

Inventors
Irving M. Stein and
Jacob C. Peters Jr.
By Cornelius D. Ehret
Attorney.

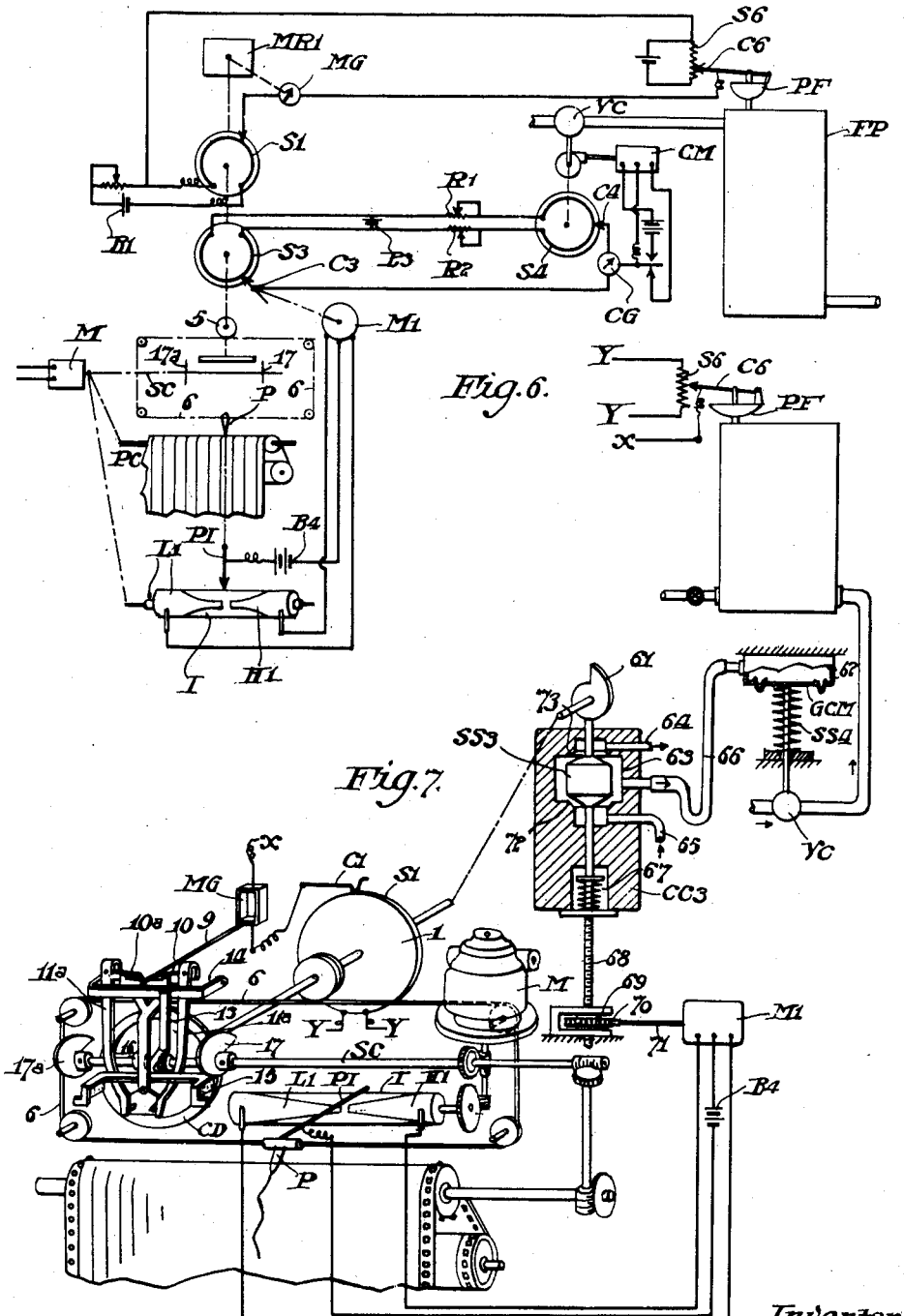

May 31, 1938.   I. M. STEIN ET AL   2,119,061
CONTROL METHOD AND APPARATUS
Filed May 1, 1936   9 Sheets-Sheet 5

Inventors
Irving M. Stein and
Jacob G. Peters Jr.
By Cornelius D. Ehret
Attorney.

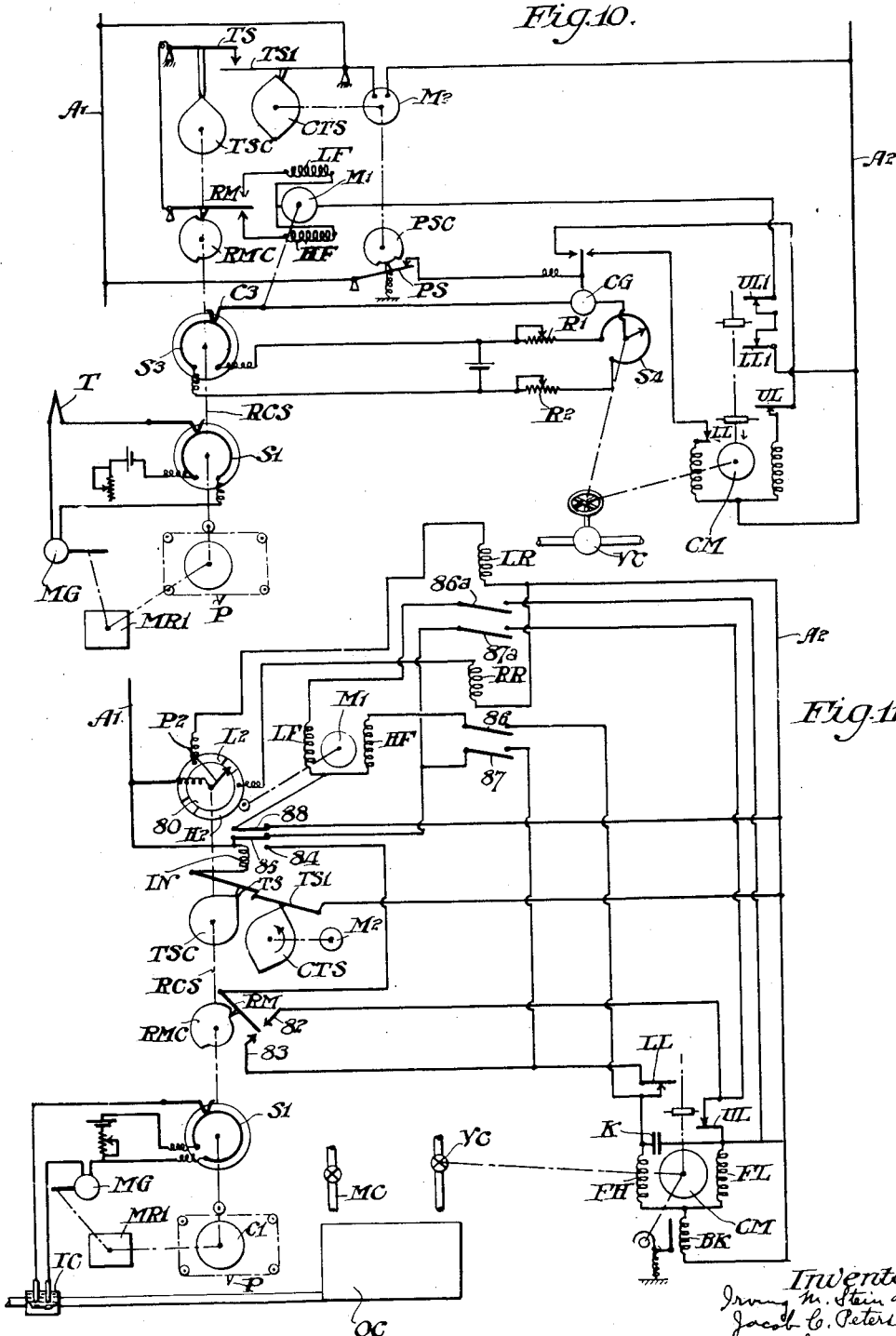

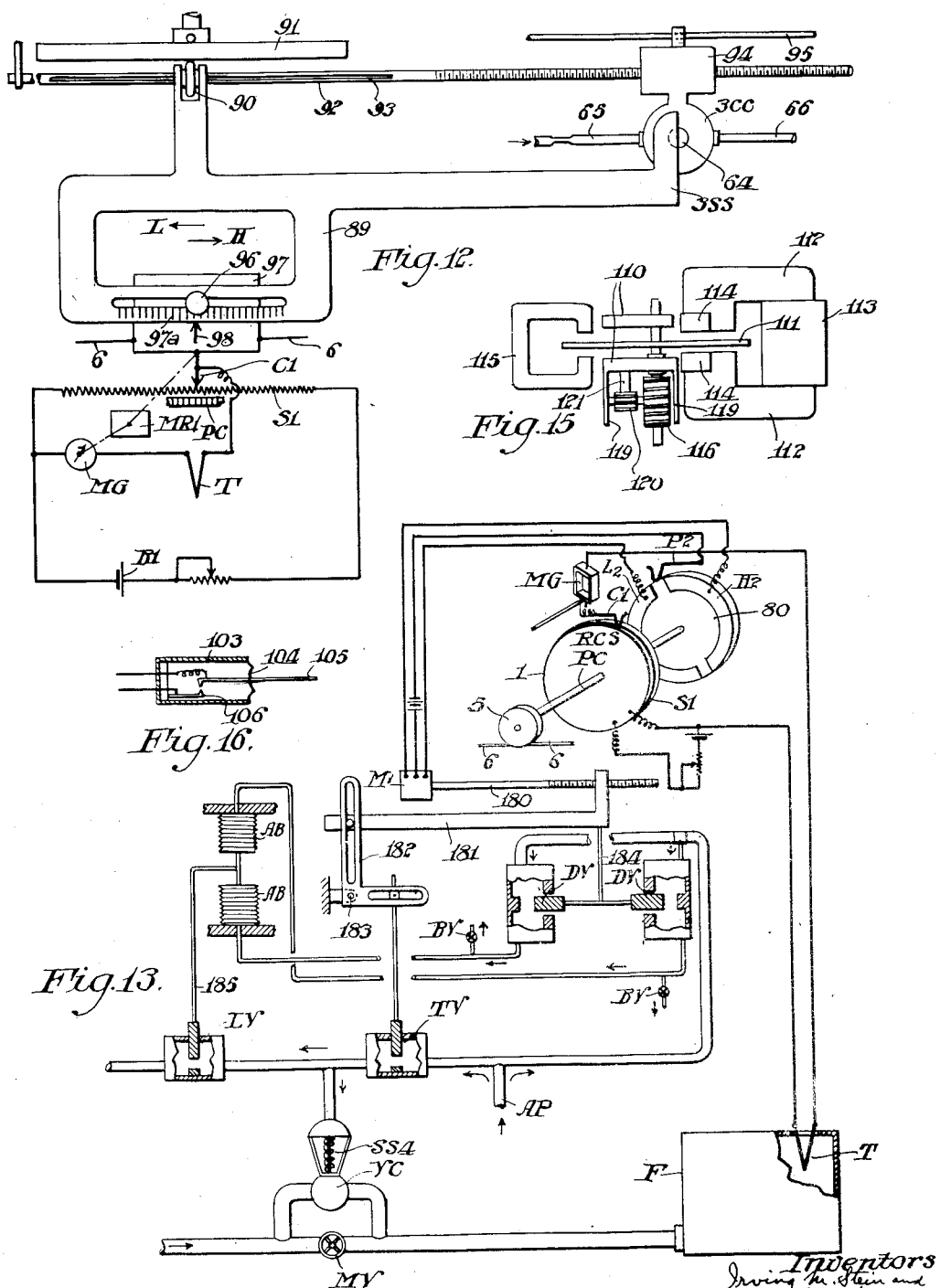

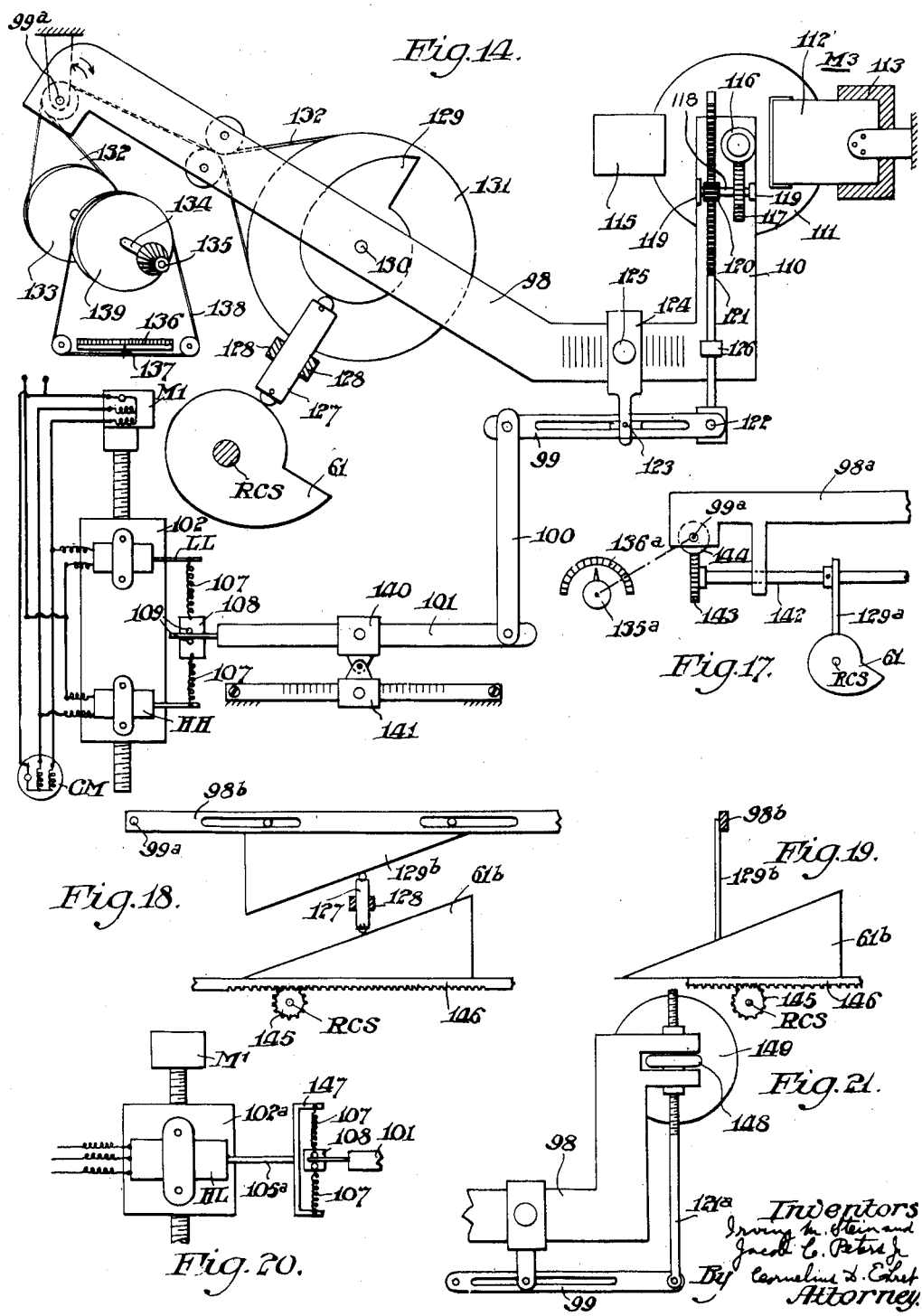

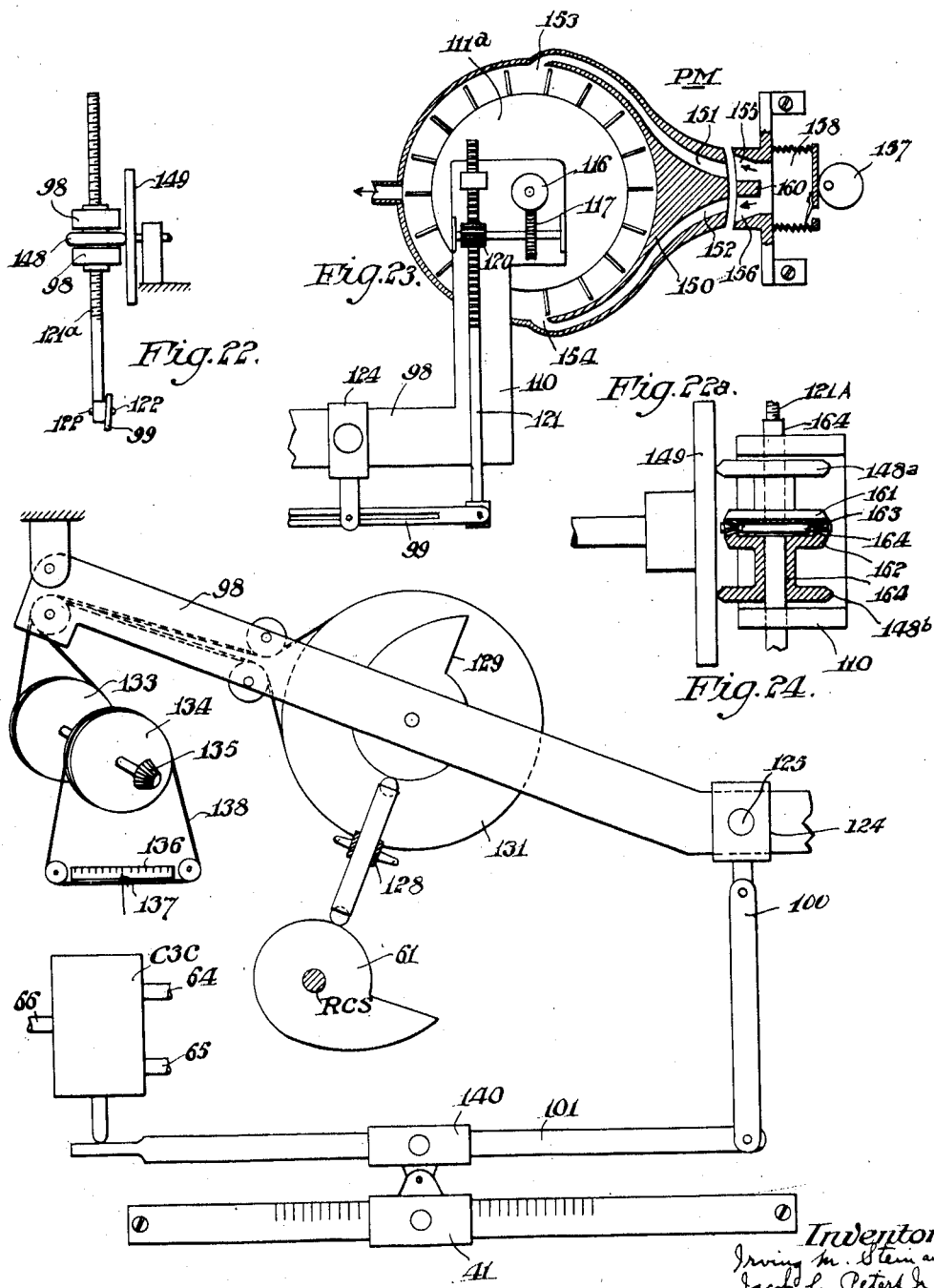

Patented May 31, 1938

2,119,061

UNITED STATES PATENT OFFICE 2,119,061

CONTROL METHOD AND APPARATUS

Irving M. Stein and Jacob C. Peters, Jr., Philadelphia, Pa., assignors to Leeds & Northrup Company, Philadelphia, Pa., a corporation of Pennsylvania Application May 1, 1936, Serial No. 77,447

20 Claims. (Cl. 172—239)

Our invention relates to methods of and apparatus for controlling the magnitude of a condition, as a chemical, physical, electrical or other condition, and more particularly to a system or apparatus which, in response to the departure of the condition from a desired magnitude, effects change in the position of a valve, rheostat, or the like, controlling the application of an agent to bring or restore the condition to a desired or normal magnitude.

In accordance with our invention, means, responsive to the changes in magnitude of a condition under control, so effects adjustment or setting of a control element that the position of said element at all times substantially corresponds to the existing magnitude of the condition; the deviation of said element from its neutral position is utilized to produce a control effect, upon the control valve or equivalent, which persists without reversal of sense so long as there is departure of said element from its neutral position in a given sense, and the adjustments of the aforesaid element in response to changes in magnitude of said condition are utilized to produce a second control effect upon the aforesaid valve, or equivalent, which control effect may be, at a given time, to adjust the valve in either sense, irrespective of the sense of the existing deviation, depending upon the sense and rate of the adjustment of the aforesaid control element at that time.

More specifically, the control element is mechanically coupled to exhibiting means, such as indicating and/or recording structure, at all times to afford an indication of the existing magnitude and/or the variations in magnitude of the controlled condition; the exhibiting means is not affected by the aforesaid control actions except indirectly and because of their effects upon the magnitude of the controlled condition.

Our invention further resides in the methods and apparatus hereinafter described and claimed.

For an understanding of our invention and for illustration of various embodiments thereof, reference is to be had to the accompanying drawings in which:

Figure 1 diagrammatically illustrates a system using one form of the invention as used to record, indicate and control the temperature of a furnace;

Fig. 2, in perspective, shows mechanical relay mechanism used in the system of Fig. 1;

Fig. 3 is a sectional view of magnetic clutch mechanism of Fig. 2;

Figs. 4, 4a, 5, 6, 7, 8, 9, 10 and 11 diagrammatically illustrate other forms of the invention and as used to control various conditions as temperature, pressure, liquid level, etc.;

Fig. 12 illustrates a modified form of control device;

Fig. 13 diagrammatically illustrates a modification using a balanceable fluid-pressure system;

Fig. 14 discloses significant elements of another system embodying the invention;

Fig. 15 is a plan view of parts appearing in Fig. 14;

Fig. 16 is a sectional view of switch structure shown in Fig. 14;

Figs. 17, 18 and 19 are fragmentary detail views of modifications of mechanism appearing in Fig. 14;

Fig. 20 is a detail view of a modification of switch structure shown in Fig. 14;

Fig. 21 is a fragmentary view showing a modification of control mechanism of Fig. 14;

Fig. 22 is an end elevational view of parts shown in Fig. 21;

Figure 5:
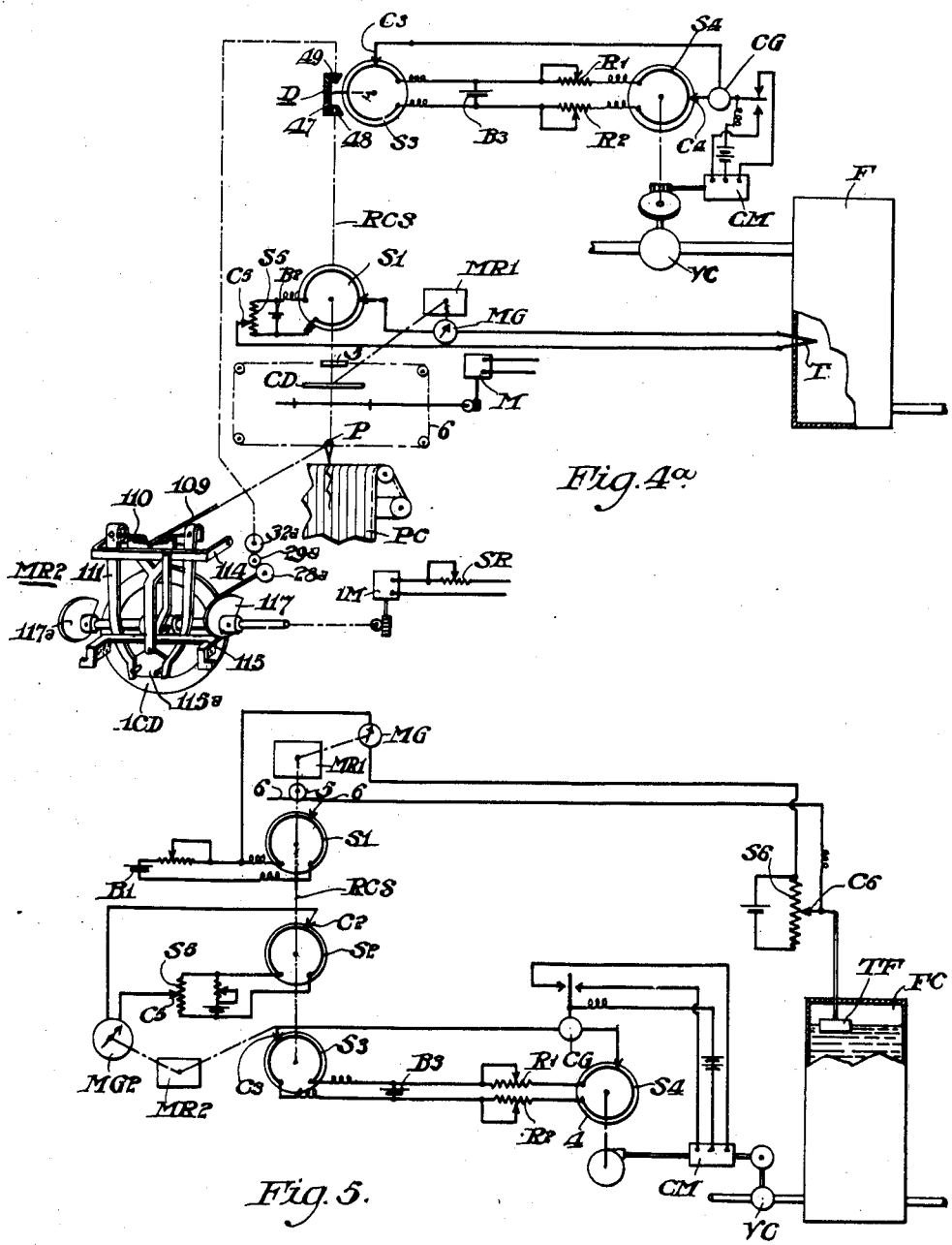

Fig. 22a discloses a modification of Figs. 21 and 22;

Fig. 23 is a detail view, partly in section, of another modification of control mechanism of Fig. 14;

Fig. 24 illustrates a modified form of the system of Fig. 14.

In Fig. 1 there is diagrammatically shown one form of the invention as applied to maintain constant the temperature of an electric furnace F. Assuming that all the elements are in the position shown, and that the temperature has increased, the voltage developed by thermocouple T is greater than the effective voltage of the slidewire S1, between the point P1 and the slidewire contact C1. In response to this unbalance the galvanometer MG deflects to effect, as by mechanical relay mechanism hereinafter described, angular adjustment of shaft RCS in such direction as to increase the effective voltage of the slidewire S1 mounted thereon, until it is equal to that of the thermocouple T.

To the shaft RCS is also secured the disk 3 upon which a slidewire S3 is mounted, so that when slidewire S1 is adjusted for rebalance with the changed thermocouple voltage, the slidewire S3 is adjusted to unbalance the bridge circuit comprising the slidewires S3 and S4. The galvanometer CG, which may be of the contact-making type shown, deflects in response to the unbalance of the control network S3, S4 to effect energization of the reversible motor CM which is suitably mechanically connected to the disk 4 on which the slidewire S4 is mounted. The resulting adjustment of slidewire S4 is in such sense as to rebalance bridge circuit S3, S4.

The motor CM, concurrently with this rebalancing adjustment of slidewire S4, changes the position of contact HC of rheostat HR to decrease the amount of heat supplied by heating coil H to the furnace. The extent of the change in position of contact HC is proportional to the extent of adjustment required to rebalance the network S3, S4, and this, in turn, is proportional to the original unbalance between the thermocouple voltage and the effective voltage of slidewire S1.

Subsequently, in the cycle of operation of the control mechanism, during continued operation of motor M, the cam SRC opens the switch SR to disconnect the galvanometer MG from the thermocouple T, and substantially concurrently the cam SDC closes switch SD to connect galvanometer MG between the contacts C2 and C5 of the slidewires S2 and S5. Contact C5, by previous manual adjustment, is at a point along slidewire S5 corresponding to the temperature it is desired to maintain in furnace F.

Slidewire S2, because of the previously described adjustment of shaft RCS on which it is mounted, may not be in the position for which the bridge circuit comprising slidewires S2 and S5 is balanced. For this position of switch SD the galvanometer MG deflects in a sense and to an extent determined by the difference between the measured or existing temperature and the desired temperature corresponding to the setting of contact C5.

This deflection of galvanometer MG is not, at this time, effective to produce movement of shaft RCS because substantially concurrently with the operation of the galvanometer transfer switches SRC and SDC, the cam RSC opened switch RS to deenergize the clutch coil RC and thereby interrupt a mechanical coupling between clutch disk CD and control shaft RCS. At substantially the same time that the clutch coil switch RS was opened, the switch DS was closed by cam DSC to effect energization of the clutch coil DC, thereby to effect a mechanical coupling between the clutch disk CD and the shaft DCS of contact C3. The electromagnetic clutch mechanism shown in Fig. 3 is hereinafter specifically described.

Accordingly, the deflection of galvanometer MG in response to unbalance of the second or deviation-measuring network S2, S5 is, through mechanical relay mechanism hereinafter described, effective to move contact C3 with respect to slidewire S3 and again unbalance the network S3, S4. In response to the unbalance, the galvanometer CG again deflects to effect further operation of motor CM in proper direction to restore balance of the network S3, S4 and thus again to operate the rheostat contact HC or equivalent control member.

Preferably the adjustment of contacts C3 in response to the deflection of galvanometer MG, when connected in the network S2, S5, is through a suitable motion-reducing mechanism so that for a given extent of deflection of the galvanometer MG, the resulting unbalance of the network S3, S4 is less when due to an unbalance of the network S2, S5 than when due to unbalance between the thermocouple voltage and the effective voltage of slidewire S1.

The cams SRC, SDC, RSC and DSC are mounted upon shaft SC1 driven at suitably reduced speed from shaft SC through gearing X. For each revolution of shaft SC1, the galvanometer MG is, therefore, for part of the revolution, connected to the thermocouple circuit, and during that period the shaft RCS is capable of being rotated in response to deflection of the galvanometer MG, and for another part of the cycle galvanometer MG is connected to the network S2, S5 during which period the contact C3 is in condition to be adjusted in accordance with the deflection of the galvanometer MG.

So long as the temperature is above normal and is continuing to rise, the control effects produced by the deflection of the galvanometer MG in both of the aforesaid parts of each successive cycle are in the same sense; both unbalance the network S3 and S4 in such sense that the contact HC is, during the rebalancing of network S3, S4 by operation of motor CM, moved in the direction reducing the energy supplied to the heater H. When the temperature ceases to rise, the galvanometer MG no longer deflects during that part of each cycle when it is connected to thermocouple T. However, it does deflect in that part of each cycle when it is in circuit with the network S2, S5 to effect further reduction in the heat input to the furnace. When the temperature, though above normal, begins to fall, the control effect produced by galvanometer MG when in circuit with the thermocouple may reverse its sense and effect heat-increasing movement of contact HC even though the measured temperature is still above normal. So long as the temperature is above normal, however, the control effect produced by galvanometer MG, when in circuit with network S2, S5, is always in the sense tending to return the temperature to the desired value.

In brief, so long as the temperature is high and rising, the successive control effects of each cycle are cumulative in their effect upon the change in the position of contact HC and when the temperature is high and falling, the control effects of each cycle are differential, the net effect being a decrease when the temperature is falling too slowly, an increase when the temperature is falling too rapidly, and zero when the temperature is falling at the desired rate.

Conversely, when the temperature is low and falling, the successive control effects of each cycle are cumulative to effect a heat-input increasing adjustment of contact HC; when the temperature is low but rising, the net control effect of each cycle may be either an increase, a decrease, or neutral, depending upon the rate of return of the measured temperature to normal.

The control system of Fig. 1 may be defined as one in which an effect varying as a function of the rate of change of the agent-controlling member, specifically rheostat contact HC, is made substantially proportional to the resultant of two effects, one of which varies as a function of the rate of change of the condition under control, specifically temperature, and the other of which varies as a departure function of the condition.

Since the position of shaft RCS corresponds at all times to the measured or existing temperature, it may be associated with suitable indicating or recording means to indicate or record the changes in temperature or other condition. Specifically, the marker or indicator P may be suitably driven as by cord 6 and pulley 5 from the shaft RCS. The member P does not respond to the deflections of the galvanometer occurring when it is in circuit with the network S2, S5, because, as above explained, during that part of the cycle, the shaft RCS is disconnected from the clutch-disk CD.

The recorder chart PC may be driven by the same motor M used to drive shaft SC1 for operation of the switches SR, SD, RS and DS. The speed of shaft SC may be, for example, about 25 revolutions per minute, and the speed of shaft SC1 on which cams SRC, RSC, SDC and DSC are mounted may be substantially slower, for example, about 5 revolutions per minute.

The adjustable resistances R1, R2 in the control network S3, S4 have two functions: the ratio of the sum of their effective magnitudes to the resistance of slidewire S4 determines how far the slidewire S4 must be moved to rebalance the bridge network S3, S4 for a given relative change of contact C3 with respect to slidewire S3; the ratio of the effective magnitude of resistance R1 to the effective magnitude of resistance R2 determines the position of slidewire S4, for which the bridge is balanced for a given relative position of contact C3 with respect to slidewire S3.

It is desirable that at least one of the control actions be suspended when the control member HC approaches or arrives at either limit of its range; specifically, the limit switches LLS and ULS are disposed to be opened, when the control member HC is moved adjacent to either limit of its range, to interrupt one of the control circuits; specifically, the two switches are connected in series in the source of current B2 which supplies the network S2, S5 so that when either of them is opened the galvanometer MG does not respond to an unbalance of this network. The suspension of the control action provides for a quicker return of the system to equilibrium with the valve in proper position than if this control action were not suspended.

Apparatus suitable to effect adjustment of the slidewires S1, S2 and S3 in accordance with the deflections of galvanometer MG and to effect operation of the switches SR, SD and RS and DS, is shown in Figs. 2 and 3. In the mechanism shown in Fig. 2, which is generally of the type shown in Leeds Patent No. 1,125,699 or Squibb Patent No. 1,935,732, the galvanometer MG is provided with a deflecting member or pointer 9 normally in the central or neutral position shown. When the galvanometer deflects in either direction from neutral position, the tip of the pointer 9 passes beneath one or the other of the arms 10, 10a of the bell-crank levers 11, 11a. During the cycle of the mechanism, the cam 12, continuously rotated by motor M, by engagement with the depending arm 13, rocks the bail member 14. Assuming that the pointer 9 is deflected to the left, this upward movement of the bail 14 through the deflected galvanometer pointer rocks the bell-crank lever 11 to swing the member 15a in counterclockwise direction and to effect angular adjustment of the clutch member 15 movable with member 15a. Subsequently, in the cycle, the cam 16 on shaft SC effects or permits engagement between the clutch member 15 and the clutch disk CD. During continued rotation of the shaft SC the cam 17 engages the clutch member 15 and returns it to the neutral position shown in Fig. 2 and, since the driven clutch member 15 is, during this time, in engagement with clutch disk CD, the shaft CDS is rotated in the sense determined by the sense or deflection of the galvanometer pointer 9 and to an extent corresponding to the extent of the deflection. For a more complete description of the operation of this mechanical relay mechanism, reference is made to the aforesaid Leeds patent.

Similarly, when pointer 9 deflects to the right the bell-crank lever 11a effects an angular adjustment of the clutch member 15 in the reverse direction and cam 17a is effective to return the clutch member to neutral position while in engagement with disk CD to effect angular adjustment of shaft CDS in a reverse direction.

As shown more clearly in Fig. 3, the shaft RCS on which the slidewires S1, S2 and S3 are mounted is hollow and mounted on shaft CDS for rotation with respect thereto. Specifically, the pulley 5, for operating the recording pen, is secured to the hollow shaft RCS and in turn is fastened to the hollow drum or disk 1a which carries the two slidewires S1, S2 and corresponds to the disks 1 and 2 of Fig. 1.

To the shaft CDS is secured the hub 18 integral with or attached to the clutch plate 19. Loosely mounted on hub 18, to the left of disk 19, is the clutch plate 20 biased into engagement with plate 19 by the spring 21. When the coil RC is energized as above described, the plate 20 is drawn into engagement with the clutch housing 22 which is secured to the drum 3a fastened to the shaft RCS. Any movement of shaft CDS occurring while coil RC is energized is transmitted through pin 23, disk 20 and clutch housing 22 to the shaft RCS to effect concurrent adjustment of slidewires S1, S2 and S3, as above described.

Loosely mounted on hub 18 to the right of disk 19 is a second clutch disk 24 biased by spring 25 into engagement with the clutch disk 19 rotatable with shaft CDS. When coil DC is energized, as above described, clutch disk 24 is attracted to and held against the clutch housing 26 secured to the hollow shaft DCS concentric with and free to rotate about the shaft CDS. Accordingly, any movement of shaft CDS occurring while coil DC is energized is transmitted through plate 19, pin 23, plate 24 and housing 26 to the shaft DCS.

As shown, upon the shaft DCS is mounted the gear 28 in mesh with gears 29 rotatable about the stub shafts 30 in the stationary frame member 31. The gears 29 are in mesh with the internal gear 32 of disk 33 attached to or integral with disk 34 from which extends the support 35 for contact C3. The hub of these disks is loosely mounted on hollow shaft DCS for rotation with respect thereto. Accordingly, movement of shaft CDS occurring while the clutch coil DC is energized is transmitted through the gearing 28, 29, 30 to the contact C3 to effect its adjustment relative to the slidewire S3 for the purpose previously described.

The members 36, 37 and 38 frictionally engage respectively the drum 3a secured to shaft RCS, the disk 34 movable with contact C3, and disk 39 secured to the shaft CDS. These brake members prevent over-travel of the several slidewires and contacts C3 due to inertia or to the slight friction between shaft CDS and shafts RCS and DCS.

As shown, the contact rings 40, 41, movable with the clutch housing 26, respectively engage the contact fingers 42, 43 secured to disk 34 to permit control of the energization of the clutch coil DC for all positions of contact C3. Current to the clutch coil RC is supplied by the flexible leads 44, 45.

The contacts C1 and C2 are carried by the stationary frame member 46 continuously to engage the slidewires S1 and S2 on the drum 1a.

The arrangement shown in Fig. 4 differs from the arrangement of Fig. 1 in that the slidewires S2, S5, the switches SR, SD for transferring the galvanometer connections, the magnetic clutches RC and DC, and their associated switches RS and DS, are omitted. In lieu thereof, to effect adjustment of contact C3, there is utilized a second mechanical relay MR2 generally similar to that shown in Fig. 2. Specifically, the pointer 109, corresponding to the pointer 9 of Fig. 2, is suitably mechanically coupled to the marker P, or any of the mechanism movable therewith, so that, so long as the measured temperature is other than the desired temperature, the pointer 109 will be deflected from its neutral position in one direction or the other depending upon whether the temperature, or other controlled condition, is higher or lower than desired.

As is apparent from the description of the operation of the similar mechanical relay mechanism of Fig. 2, so long as the pointer 109 remains deflected, the clutch disk ICD will be intermittently stepped in a direction corresponding to the sense of deflection of the pointer 109, the length of each step being substantially proportional to the extent of deflection of the pointer from neutral. The motion of the shaft on which the disk ICD is mounted is transmitted to the contact C3 by means including the train of gears 28a, 29a and 32a for suitably reducing the motion. The speed of adjustment of contact C3 may also be varied or predetermined by adjustment of the rheostat SR in circuit with the motor 1M which drives the second mechanical relay.

The elements of the second mechanical relay MR2 have been identified by reference numbers one hundred greater than those applied to the corresponding elements of the mechanical relay of Fig. 2.

The operation of the system should be clear from the preceding description of Fig. 1. Briefly, upon a change of temperature, the galvanometer MG deflects to effect through mechanical relay MR1, of the type shown in Fig. 2, a rebalancing adjustment of the slidewire S1. The rotation of the shaft RCS also effects an adjustment of slidewire S3 to unbalance the bridge network S3, S4, whereupon the galvanometer CG deflects to effect operation of motor CM. The slidewire S4 is adjusted thereby with respect to its contact C4 in proper direction to rebalance the network S3, S4 and concurrently to change the setting of valve VC to change the heat input to the furnace.

The displacement of the marker P from its normal neutral position effects a deflection of the pointer 109 of the second mechanical relay so that so long as marker P remains away from the position corresponding to the desired temperature, contact C3 is slowly and intermittently adjusted to effect further and slow unbalancing adjustment of slidewire S3; specifically, the rate of adjustment of contact C3 is substantially proportional to the existing departure of the temperature, or other controlled condition, from normal. Accordingly, the galvanometer CG controls the motor CM to effect a further and slow adjustment of the valve VC and the slidewire S4.

The system will come to equilibrium when the valve VC is in such position that the temperature is restored to the desired magnitude at the new load, or other condition, which caused the temperature change.

When the system is returned to equilibrium the slidewire S1 will have been returned to the position shown in Fig. 4 but contact C3, slidewire S4 and valve VC will each have a new position.

The two control actions are, as in the system of Fig. 1, cumulative when the temperature is high and rising, or low and falling; but are differential when the temperature is high and falling, or low and rising. Specifically, so long as the marker P and pointer 109 are away from normal position in one sense, the contact C3 will be always stepped in the same direction, whereas, the adjustment of slidewire S3 may be in either one direction or the other, regardless of which side of neutral the pointer P may happen to be, depending upon whether the temperature is rising or falling.

In both the systems of Figs. 1 and 4, the rate of change of the ratio of the resistances of the bridge arms on either side of contact C4 representative of the position of the control member, depends upon the rate of change of the ratio of the resistances of the other two bridge arms, which is a function of the rate of change of the controlled condition, and also upon the existing deviation from the desired magnitude of the condition. It is characteristic of both control systems that rapid control action is obtained without hunting or overshooting, and that the temperature is always returned to the desired magnitude, as distinguished from control systems in which the control member is operated solely in response to a change in magnitude of the controlled condition.

The modification shown in Fig. 4a is generally similar to that of Fig. 4, differing therefrom in the mechanism for effecting relative adjustment of slidewire S3 and contact C3. In the arrangement of Fig. 4a, the contact C3 is stationary, and slidewire S3 is mounted for rotation by or with the gear 47 of differential D. The pinion 48 is driven by shaft RCS and adjusted in accordance with the deflections of galvanometer MG in response to unbalance between the thermocouple voltage and the effective voltage of slidewire S1. The other differential pinion 49 is driven from the clutch disk ICD of the second mechanical relay MR2, through suitable speed-reducing gearing, in accordance with the position of the pointer 109 corresponding to departure of the temperature from the desired magnitude. Accordingly, the position of slidewire S3 is at all times under the control of the temperature deviation and the rate of change of temperature.

Gear 49 is intermittently rotated in one direction so long as the temperature is high and intermittently rotated in reverse direction so long as the temperature is low; the direction of rotation of the gear 48 of the differential depends upon whether the temperature has risen or fallen since the immediately prior measurement by slidewire S1. The resultant of these two motions is communicated to and determines the position of slidewire S3. The operation of this system in its effect upon the adjustment of the control valve VR is substantially the same as effected in the systems of Figs. 1 and 4 by individual adjustments of the slidewire S3 and contact C3.

In the systems of Figs. 4 and 4a, the desired or normal temperature may be varied by connecting (as shown in Fig. 4a) one end of the thermocouple to a variable point C5 on a second slidewire S5 connected in parallel with slidewire S1.

The arrangement shown in Fig. 5 is similar to that of Fig. 1 in that it utilizes three slidewires S1, S2 and S3 having the same purpose and function as in the arrangement of Fig. 1; and is similar to the systems of Figs. 4 and 4a in that it utilizes a second mechanical relay whose pointer is set by the controlled shaft of the first mechanical relay.

By way of variation, the control system of this modification is shown as applied to a system for maintaining constant level of a liquid in a tank FC. The float TF is mechanically connected to contact C6 to effect its adjustment with respect to a potentiometer slidewire S6 for a change in level. Assuming a change in level, the effective voltages of the slidewires S1 and S6 no longer balance and the galvanometer MG deflects to effect, through suitable mechanical relay mechanism MR1, adjustment of shaft RCS. Concurrently with the resulting rebalancing adjustment of slidewire S1, the slidewires S2 and S3 are adjusted. The movement of the latter unbalances the bridge network S3, S4, whereupon galvanometer CG deflects to effect by motor CM a rebalancing adjustment of slidewire S4 and movement of valve VC in proper direction to return the liquid level to or toward the desired height.

So long as the slidewire S2 is away from the position for which the bridge network S2, S5 is balanced, the galvanometer MG2 remains deflected from its neutral position to effect, through the second mechanical relay MR2 and a suitable motion-reducing mechanism, adjustment of contact C3 in proper sense to effect return of the level to that height for which the network S2, S5 is balanced, as predetermined by the manual adjustment, or setting, of contact C5.

As in the modifications of Figs. 4 and 4a, the two measuring networks are continuously concurrent in their effects upon the unbalance of the control network S3, S4, unlike the modification of Fig. 1 in which the measuring networks are alternatively effective.

The modification shown in Fig. 6 is generally similar to that shown in Fig. 4 differing therefrom in the mechanism for effecting adjustment of the slidewire contact C3. When the marker P is in the position corresponding to the desired magnitude of the condition, the contact PI is in its normal or neutral position and does not engage either of the contacts L1, H1 on the drum I which is continuously rotated, as by the motor M. When, however, the temperature, pressure, or other condition is above normal, the pointer P, or some element movable therewith, displaces the contact PI to the right so that it engages the contact H1 for a portion of each revolution of the drum I. Conversely, if the temperature or pressure is low, the contact PI is displaced to engage the contact L1 during the portion of each revolution of the drum I. The contacts L1, H1 and PI form a reversing switch for the reversible motor M1 which is suitably mechanically connected, through suitable speed-reducing means, to the slidewire contact C3.

Preferably the contacts L1 and H1 progressively increase in width away from the neutral point so that the duration of engagement between contact PI and one of the other contacts L1, H1 is increasingly greater, in each revolution of the drum, the greater the displacement of contact PI from its neutral position. If desired, the configuration of contacts L1 and H1 may be identical, similar or dissimilar depending upon the response characteristic of the controlled system.

Therefore, so long as the controlled condition is away from the desired magnitude, the contact C3 is intermittently adjusted in the proper direction to return the condition to the desired magnitude, the lengths of the increments of adjustment or the speed at which it is being adjusted being greater the larger the existing deviation from normal, and progressively smaller the less the deviation from normal.

As in the preceding modifications the ratio of the resistances of the arms of the control bridge formed by the slidewire S3 is determined by the deviation of the control condition from normal and also its rate of change.

By way of variation, the system of Fig. 6 is shown as applied to maintain constant the pressure in a tank FP. A suitable pressure-responsive device PF adjusts the position of contact C6 of the slidewire S6 in accordance with the existing pressure.

When the effective voltages of the two potentiometers S1 and S6 are not equal, the galvanometer MG deflects to effect, through a mechanical relay mechanism MR1, a rebalancing adjustment of the slidewire S1, and concurrently effects an unbalancing adjustment of the slidewire S3. In response to this unbalance of the control network S3, S4, the galvanometer CG deflects to effect operation of motor CM which adjusts the valve VC until the slidewire S4, moved concurrently therewith, is moved to such position as to rebalance the network S3, S4. If the pressure is other than the desired magnitude, however, this rebalance of the control network S3, S4, is only temporary since the displacement of contact PI from neutral position causes a slow adjustment of contact C3 by motor M1 and a correspondingly slow adjustment of the slidewire S4 by motor CM until the pressure is restored to the desired value.

The magnitude at which the pressure is held constant may be varied simply by adjusting the drum I on its shaft, thus to change the neutral position of contact PI.

It is characteristic of this modification, in common with those previously described, that the two measuring effects are cumulative upon the control network S3, S4 when the pressure is high and rising, or low and falling, and are differential when the pressure is high and falling, or low and rising.

The modification shown in Fig. 7 is generally similar to the arrangement of Fig. 6, differing therefrom principally in that the position of the valve VC, or equivalent control member, is controlled by a balanceable fluid-pressure system rather than a balanceable electrical network. Assuming that galvanometer MG has deflected in response to an increase in pressure, temperature, or other controlled condition, the clutch disk CD is moved, as above described, in a counter-clockwise direction to effect a rebalancing adjustment of the slidewire S1 and concurrently therewith the cam 61, rotatable with or by the shaft of disk CD, is rotated to a corresponding extent, allowing the valve member SS3 to rise under the influence of the biasing spring 67. This, as hereinafter more fully explained, results in an increase in the pressure tending to move the diaphragm GCM downwardly in opposition to spring SS4. The movement of the diaphragm GCM and of the movable member of the valve VC connected thereto continues until the increased pressure is balanced by spring SS4.

Conversely, if the clutch disk CD of the mechanical relay is operated in clockwise direction, the valve SS3 is depressed to effect a decrease in pressure in chamber 62, whereupon the spring SS4 moves the diaphragm GCM upwardly to effect opening movement of the valve VC, the movement continuing until the decreasing force exerted by spring SS4 is balanced by the lower pressure in chamber 62.

The chamber 63 in which the valve member SS3 is disposed is connected by passageway 72 and pipe 65 to a suitable source of fluid pressure. One of the outlets of the chamber is connected by the flexible tubing 66 to chamber 62 of the valve-operating device, and the other outlet 64 of the chamber includes the passageway 73. When the valve member SS3 is moved downwardly, the cross-section of the passageway 72 is reduced to decrease the supply of fluid from the source, and concurrently the cross-sectional area of the passageway 73 is increased to increase the leakage from chamber 63 and chamber 62 connected thereto. Accordingly, for every position of the valve member SS3 with respect to the housing CC3 there obtains a definite pressure in chamber 62, and a definite position of the valve VC.

So long as the temperature, or pressure, or other controlled condition is not at the desired magnitude, the contact PI, positioned by the recorder pen or marker P, intermittently engages one or the other of the contacts LI, HI of the continuously rotating drum I to effect intermittent energization of motor MI to effect raising or lowering of the housing CC3 which comprises the chamber 63 for valve SS3. Specifically, the housing CC3 is mounted upon the threaded shaft 68 which extends through the internally threaded hub of the gear 69 driven from motor MI through the worm 70. As the motor MI is rotated in one direction, the housing CC3 is accordingly lifted to decrease the cross-sectional area of passage 72 and concurrently increase the cross-sectional area of passage 73, and conversely, when the motor rotates in reverse direction the housing CC3 is lowered to decrease the cross-sectional area of the vent passage 73 and concurrently to increase the cross-sectional area of the inlet passage 72.

So long as the temperature or pressure is above normal, contact PI intermittently engages contact HI to raise the housing CC3 tending to cause a reduction of pressure in the chamber 62 and therefore closing movement of valve VC; conversely, so long as the pressure or temperature is subnormal, the contact PI intermittently engages contact LI to cause lowering of the housing CC3 and therefore increase the pressure in the chamber 62 and opening movement of valve VC.

The pressure within the chamber 62 is also determined by the position of cam 61 which may rotate in either direction during either raising or lowering of the housing CC3. In other words, the effects of cam 61 and the intermittent contact between contact PI with contact HI or LI are cumulative if the controlled condition is above normal and rising or below normal and falling and differential if the controlled condition is above normal and falling or below normal and rising.

By way of variation, the measuring circuit for controlling the galvanometer MG is shown as of the Wheatstone bridge type, the slidewire SI forming one pair of bridge arms and the slidewire S6 forming the other pair of arms. The position of contact C6 along the slidewire S6 is controlled by the pressure-responsive device PF or equivalent. It is, of course, to be understood that in all modifications the primary responsive element is chosen to suit the condition to be controlled, and may in any known way be utilized to control the position of the pointer 9 of the relay mechanism.

The control point, that is, the magnitude of the condition at which it is desired to hold the condition constant, may be varied by shifting the drum I longitudinally of its shaft, thereby to change the neutral position of the contact PI.

Figure 8:
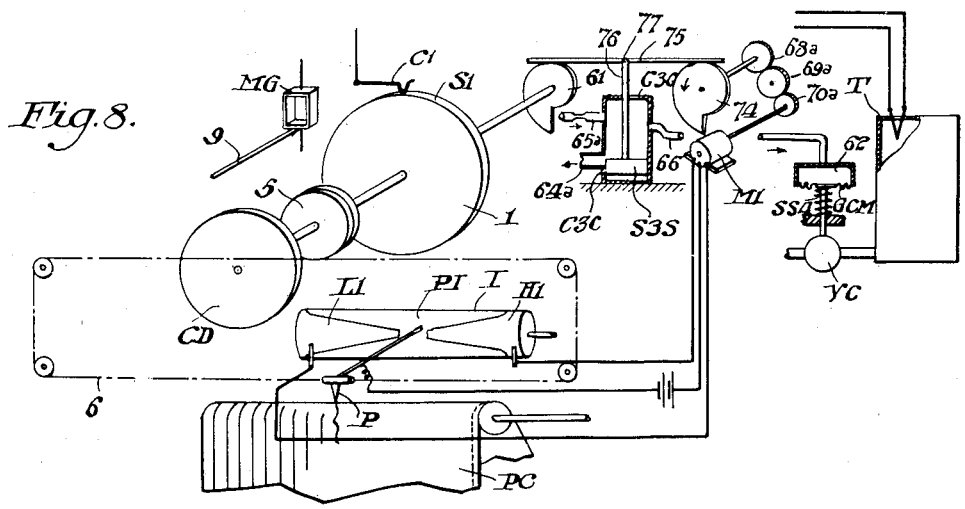

The modification shown in Fig. 8 also utilizes a fluid-pressure control system for the valve. In this modification the valve housing C3C is stationary and the position of the valve member S3S which determines the pressure in the chamber 62 of the valve-operating mechanism is controlled by two cams, one of which is the same as cam 61 of Fig. 7 and whose movement is a function of the rate of change of the controlled condition. The other cam 74 whose movement is a function of the deviation of the condition from normal is operated through suitable speed-reducing gearing 68a, 69a and 70a, and from the motor MI which is controlled as in the modification of Fig. 7.

The stem 76 of the valve member S3S is, at its upper end, pivoted to the cross member 75 which rests upon the cams 61 and 74 so that the position of the pivot 77 and, therefore, of valve S3S is jointly determined by the positions of both cams.

Assuming, for example, that the disk CD is angularly adjusted in counterclockwise direction in response to an increase in temperature, the left-hand end of the cross-member 75 falls and consequently the valve S3S moves downwardly to decrease the pressure in chamber 62 with resulting closing movement of valve VC. Assuming that, at the same time the temperature is above normal, the contact PI intermittently engages the contact H2 to effect energization of motor MI in such sense that cam 74 rotates in counterclockwise direction, permitting the right-hand end of the cross-member 75 to fall. This effects further decrease in pressure in the chamber 62 of the mechanism for operating valve VC. So long as the temperature is above normal this counterclockwise rotation of cam 74 continues. However, if the temperature, though above normal, begins to return too rapidly towards normal, the cam 61 is rotated in clockwise direction to lift the left-hand end of the cross-member 75, thereby to lift the valve member S3S to increase the pressure in chamber 62 and check the too rapid return to normal. As in the prior electrical arrangements, the rate of change of the position of the valve is made substantially proportional to the resultant of effects which, respectively, are functions of the deviation of the condition from normal and the rate of change of the condition.

The control point may be changed by shifting the drum I along its shaft, thus to vary the neutral position of the contact PI.

Figure 9:
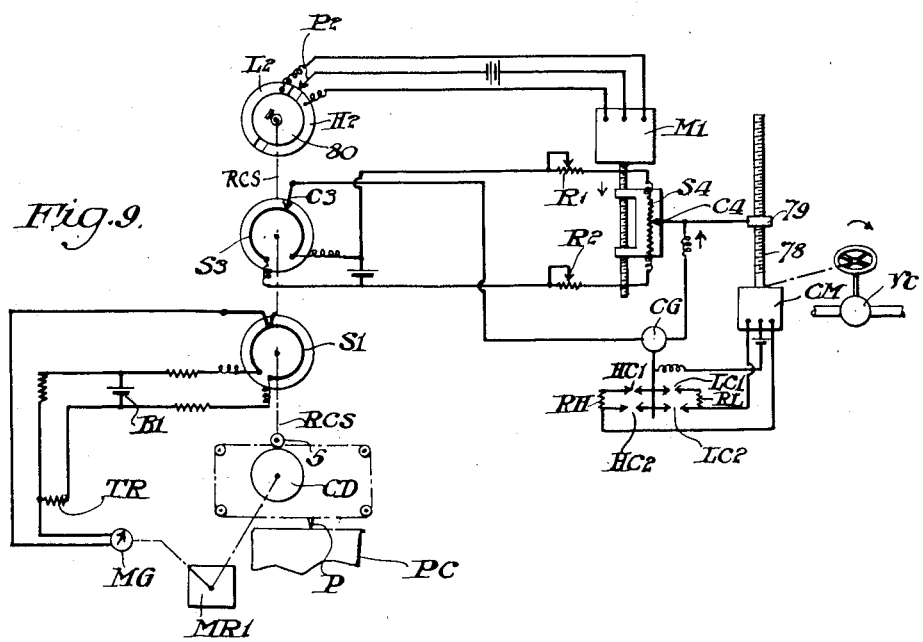

In the modification shown in Fig. 9, the measuring circuit including slidewire SI is a temperature-responsive Wheatstone bridge including a resistor TR of a conductor having a substantial temperature coefficient of resistance. Upon a change in temperature, the galvanometer MG deflects in response to the resulting unbalance of the bridge to effect through the mechanical relay MRI a rebalancing adjustment of slidewire SI. The movement of shaft RCS is also transmitted to slidewire S3 and unbalances the control network S3, S4, whereupon the galvanometer CG deflects to effect energization of motor CM which, through threaded shaft 78 and traveling nut 79, effects an adjustment of contact C4 in proper direction to rebalance the network S3, S4.

So long as the temperature is higher or lower than normal, the contact disk 80 on shaft RCS is displaced from its neutral position so that contact P2 is in engagement with contact L2 or H2, depending upon whether the temperature, or other controlled condition, is higher or lower than normal. Contacts P2, L2 and H2 form a reversing switch for the reversible motor M1 suitably mechanically coupled to slidewire S4 to effect a slow movement thereof.

Accordingly, so long as the temperature is above normal, the motor M1 effects slow movement of slidewire S4 in a sense tending to unbalance the control network S3, S4 in such sense as to effect closing movement of valve VC; and contact C4 is adjusted in one direction or the other by motor CM, with concurrent opening or closing movement of valve VC, to control the rate of change of temperature; conversely, so long as the temperature is below normal, the motor M1 is energized in the reverse sense and effects slow adjustment of slidewire S4 in the opposite direction tending to unbalance the control network in such sense as to effect opening movement of valve VC; if, however, the temperature is too rapidly being raised toward normal, the adjustment of contact C4 by motor CM unbalances the control network S3, S4 in a reversed sense to effect temporary closing movement of the valve VC.

In this modification, as well as in others herein described, means may be provided to afford low speed of operation of motor CM for small unbalances of network S3, S4, and higher speed for large unbalances. Specifically, for small deflections of galvanometer CG, the motor circuit by closure of contacts HC1, or LC1 includes resistor RH or RL which reduces the energy supplied to the motor CM; for large deflections, the contacts HC2 or LC2 are closed, excluding either of resistors RH, RL, and so resulting in higher rate of adjustment of the valve VC, or equivalent agent-controlling member.

In this modification, the control point can be varied by shifting the contact disk 80 angularly on the shaft RSC. The proper setting is determined by adjusting the marker P to correspond with the desired temperature on the scale PC and then shifting the contact disk 80 so that neither contact L2 or H2 engages contact P2. Alternatively, the contact P2 may be adjusted angularly with respect to a calibrated scale, the contact disk 80 remaining in its original position on the shaft.

In the modification shown in Fig. 10, the adjustment of slidewire S1 in response to unbalance of the measuring circuit including thermocouple T, or other condition-responsive device, is accompanied by an unbalancing adjustment of slidewire S3 whereupon, as in prior modifications, the galvanometer CG deflects to effect operation of motor CM to change the valve setting until the bridge balance is restored by the concurrent adjustment of slidewire S4.

The aforesaid adjustment of slidewires S3 and S1 is accompanied by movement of the cams RMC and TSC, the former controlling the position of switch member RM to determine which of the fields LF, HF of the reversible motor M1 may be energized, and the latter controlling the length of the periods during which current is supplied to motor M1 which, as indicated, is mechanically connected to slidewire contact C3 to effect slow adjustment thereof.

More specifically, the circuit of motor M1 includes the switch contacts TS1 connected to one line conductor A1, switch contact TS connected to switch member RM, and the limit switches UL1 and LL1, the latter being connected to the other line conductor A2.

The motor M2, which may be the motor M of the mechanical relay mechanism MR1, drives the cam CTS to oscillate the contact TS1. When the temperature is at the desired magnitude the cam TSC on shaft RCS holds contact TS in such position that it is not engaged by contact TS1 during its oscillation. When, however, the temperature is above or below normal, contact TS is lowered so that it is engaged by contact TS1 during part of its cycle of oscillation, the duration of engagement in each cycle being greater the greater the displacement of cam TSC from its neutral position. When the temperature is higher or lower than normal, the cam RMC on shaft RCS is also displaced from its neutral position operating contact RM to connect one or the other of the motor field windings HF, LF to the contact TS. Accordingly, so long as the temperature is above normal, the motor M1 is intermittently energized for periods substantially proportional to the temperature deviation from normal to effect adjustment of contact C3 in the sense tending to effect closing movement of valve VC, and conversely so long as the temperature is subnormal, motor M1 is intermittently energized in the reverse sense for periods substantially proportional to the temperature deviation to effect a reverse adjustment of contact C3 tending to effect opening movement of the valve.

When the valve reaches either limit of its adjustment, one or the other of the limit switches UL1, LL1 is opened to interrupt the circuit of motor M1 and so prevent temporarily any further adjustment of contact C3; and one or the other of limit switches LL, UL is opened to interrupt the circuit between one of the fields of motor CM and the corresponding contact of galvanometer CG.

Preferably, the circuit to motor CM controlled by galvanometer CG is permitted to be closed only at intervals; specifically, the switch PS is periodically opened by cam PSC driven continuously as by motor M2. By allowing the galvanometer CG to complete the circuit of motor CM only at intervals, the number of reversals of motor CM is substantially reduced without materially affecting the desired control action. During the return to normal temperature, the rate and deviation control effects tend to move the valve in opposite directions. By limiting the time during which the motor can operate, the resultant action is substantially in accordance with the algebraic sum of the two effects during the preceding period during which switch PS was open.

The system shown in Fig. 11 is similar to previously described modifications in that shaft RCS is adjusted, as through a mechanical relay MR1, upon unbalance of a measuring network. Specifically and by way of variation, the measuring network includes an ion-concentration cell IC whose generated voltage changes with change in hydrogen-ion concentration of the liquid from tank OC, whereupon galvanometer MG deflects to effect control, as hereinafter described, of valve VC whose position determines the rate of addition of an agent affecting the hydrogen-ion concentration of the liquid in tank OC. It is to be understood, however, that the system is not limited to control of ion-concentration but is of general application.

When the ion-concentration is of the desired magnitude, the cam RMC on shaft RCS maintains the contact RM out of engagement with the fixed contacts 82, 83 connected, respectively, to the windings FH, FL of motor CM which may be, as shown, a split-phase synchronous or induction motor, the phase-splitting being accomplished by condenser K. Upon an increase or decrease of ion-concentration, cam RMC is shifted angularly in one direction or the other to effect engagement of contact RM with one or the other of contacts 82, 83 for rotation of motor CM in the proper direction to return the ion-concentration to normal. However, motor CM does not run continuously when contact RM is in engagement with fixed contact 82 or 83 because contact RM is connected in series with the contacts 84, 85 of relay IN whose energization is controlled by switch contacts TS, TS1. As in the modification of Fig. 10, the position of contact TS is controlled by cam TSC on shaft RCS and contact TS1 is oscillated by the continuously rotating cam CTS. Therefore, so long as contact RM remains in engagement with contact 82 or 83, motor CM is intermittently energized for periods whose duration depends upon the displacement of cam TSC from neutral position; the greater the deviation of the ion-concentration from normal the longer the periods of energization of motor CM in the sense effecting adjustment of valve VC to restore the ion-concentration to normal.

Upon a change in ion-concentration, the movement of shaft RCS also effects engagement between contact P2 and one or the other of the contacts L2, H2 connected, respectively, to relays LR, RR. Assuming the ion-concentration increases from the previously existing magnitude, contact P2 engages contact H2 to energize relay RR and lift contacts 86, 87. When, therefore, in the cycle of the mechanism, the relay IN is deenergized by separation of contacts TS, TS1, the circuit of coil FH of the valve motor CM is completed from line conductor A1 to line conductor A2 through contact 85 of relay IN, contact 87 of relay RR, limit switch LL, and the brake coil BK; at the same time, the circuit including field coil HF of motor M1 is completed from line conductor A2 to line conductor A1 through contact 88 of relay IN, contact 86 of relay RR, limit switch LL, contact 87 of relay RR, and contact 85 of relay IN. Therefore, concurrently with the energization of the valve motor CM, the motor M1 is energized to move disk 80 in clockwise direction to move contact H2 out of engagement with contact P2.

Conversely, upon a decrease in ion-concentration from the previously existing magnitude, contact P2 engages contact L2 on disk 80 to energize relay LR and thus effect reverse operation of motors CM and M1 during that portion of each cycle during which relay IN is deenergized.

The deviation control due to cam RMC and the rate-of-change control due to contacts P2, H2, L2 and motor M1, occur alternately and may, as explained in connection with preceding modifications, be cumulative or differential in their effect upon the adjustment of valve VC depending upon the sense of the deviation from normal and the sense of the rate of change.

It is to be noted that the motor M1, which may be a Warren "Telechron" motor of the reversible type, receives power through circuits including the limit switches LL and UL of the valve motor CM so that motor M1 cannot operate when simultaneous operation of valve motor CM is prevented because the valve has reached its maximum or minimum position. This arrangement affords more prompt return to normal when a limit has been reached during deviation from normal. Otherwise, assuming an increase, for example, of ion-concentration, or other condition, to an extent substantially greater than required to close the valve, the motor M1, if permitted to run and return disk 80 to neutral with respect to contact P2, would cause opening movement of valve VC as soon as the ion-concentration, though still too high, started to fall; this would delay the return to normal. By preventing operation of motor M1 when motor CM cannot operate because limit switch LL is open, the valve will not begin to open until the ion-concentration existing when the minimum valve limit was reached during the departure from normal is again encountered during the return to normal.

The mechanism shown in Fig. 12 is in the nature of an attachment to a self-balancing recorder of the type generally as shown in aforesaid Leeds or Squibb patents, to apply "deviation and rate" control to a valve or other control device such as shown in Fig. 7, for example, whose position is determined by pressure of a control fluid.

Upon departure of the controlled condition, for example, temperature, the galvanometer MG deflects to effect relative adjustment of contact C1 and slidewire S1 to reestablish balance of the measuring network; concurrently with this adjustment, the slideable frame 89 is moved linearly to the right or left and to an extent corresponding to the adjustment of contact C1. Thus, the valve member 3SS carried by frame 89 changes the effective area of the bleeder port 64 to vary the pressure transmitted by tube 66 to a valve-actuating member such as diaphragm GCM of Fig. 7; in general, the valve member 3SS of Fig. 12 has the same function as valve member SS3 of Fig. 7 and valve member S3S of Fig. 8.

The departure of frame 89 from its neutral position also moves the wheel 90 away from the center of the continuously rotating disk 91 so that shaft 92, having a spline 93 to maintain driving engagement with wheel 90, is driven in one direction or the other depending upon the sense of the temperature deviation and at a rate depending upon the extent of the temperature change.

Shaft 92 threadably engages the internally threaded member 94 integral with or attached to the pressure-chamber 3CC to effect movement thereof so long as frame member 89 is displaced from its neutral position and at a rate proportional to the extent of deviation of the controlled condition from normal. The rod 95 is generically illustrative of means to inhibit any tendency of member 94 to rotate and to cause linear movement of member 94 during rotation of shaft 92.

Accordingly, the pressure in chamber 3CC and, therefore, the position of the control valve, is varied as a function of the deviation from normal and the rate of change of the controlled condition.

The control point may be shifted by temporarily loosening the clamping nut 96 and adjusting frame 89 with respect to the driving member or block 97 which may be suitably coupled as by cord 6 driven from the controlled shaft of the recorder, as shown in preceding figures. To assist in the adjustment, the frame 89 may be provided with a scale 97a adapted to cooperate with an index 98 on block 97. In the modification shown in Fig. 13, the control system between the valve VC, or equivalent agent-controlling member and the measuring apparatus utilizes a control fluid, as a gas, instead of an electric current. In common with other systems herein described, it comprises two control elements, one a quick-acting stable element and the other a slower-acting compensating element.

Air, or other control fluid, is introduced by pipe AP into the pneumatic network comprising the throttling valve TV, the adjustable leak valve LV, the differential valves DV, the bleeder valves BV, and the bellows AB.

Assuming departure of the temperature from the desired magnitude, galvanometer MG deflects to effect a rebalancing adjustment of slidewire S1; the movement of disk 80 effected, concurrently with the adjustment of slidewire S1, causes contact P2 to engage one or the other of contacts H2, L2. Accordingly, motor M1 rotates in one direction or the other, depending upon the sense of departure of the controlled condition from normal to effect through threaded shaft 180, threaded carriage 181, and bell-crank lever 182, adjustment of the throttling valve TV in the proper sense to restore the temperature toward normal.

By selection or adjustment of the position of the fulcrum 183 of the bell-crank lever, the valve VC may be made to move through its entire range for any desired extent of movement of slidewire S1 and, therefore, for any extent of change of the temperature of chamber F. The valve TV and its operating mechanism provide a stable, rapid control action; however, the control characteristic is drooping, i. e., a larger opening of valve VC can be maintained only at the expense of a somewhat lower temperature in chamber F.

To eliminate this drooping characteristic, so that the desired magnitude of temperature may be obtained regardless of the setting of valve VC required to meet the heat demand, there is provided an additional control which acts slowly upon the leak valve LV. Specifically, the carriage 181 is also connected, as by member 184, to valves DV to effect their differential operation. The control fluid flows through valves DV in parallel and exhausts through the manually adjusted bleeder valves or ports BV; the control fluid through the valves DV also creates opposing pressures in the pair of bellows AB. The free ends of the bellows are mechanically coupled to each other and to the operating member 185 for the leak-valve LV.

The bellows AB are constructed to have negligible spring characteristics so that they will move the leak-valve LV to one or the other of its extreme positions whenever the pressures in the opposed bellows are unbalanced. The capacities of the bellows are large and the area of the ports of the differential valves DV are small, even for maximum opening; hence the adjustment of valve LV is at slow rate. The speed of operation can be predetermined by adjustment of the bleeder valves BV.

When carriage 181 is in the position corresponding to the desired temperature, the valves DV are in such position that the pressures in the opposed bellows AB are equal and, therefore, there is no movement of valve LV. However, upon departure of temperature from the desired value, the valves DV are differentially adjusted to unbalance the pressures in the bellows AB, whereupon the valve LV is adjusted in the sense causing valve VC to be adjusted in the sense restoring the temperature toward the desired value.

Preferably, as shown, valve VC is in shunt to a valve MV which is manually set at substantially the minimum requirement of the agent.

The mechanism shown in Figs. 14 and 15 is in the nature of an attachment to recorder mechanism of the type shown in the Leeds and Squibb patents to convert it to a controller suited to apply combined deviation and rate-of-change control.

The cam 61, corresponding to cam 61 of Figs. 7 and 8, is adjusted in accordance with the changes in the balance point of a measuring network, or more generally, is positioned in accordance with the existing magnitude of the controlled condition.

Angular movement of cam 61 effects corresponding movement of the frame 98 pivoted at the stationary point 99a. The rocking movement of frame 98 is transmitted through links 99 and 100 to the pivoted member 101 to effect operation of one or the other of switches HH, LL to effect operation of the valve motor CM and motor M1 which moves the block 102 upon which the switches HH, LL are mounted until they are opened for the then existing position of member 101. In lieu of M1, there may be employed between the shaft driven by motor M1 and that driven by motor CM, other motion transmitting means such as a pair of "Selsyns" or a device of the type disclosed in Kolff Patent No. 1,536,021.

As appears from Fig. 16, each of the switches HH, LL comprises a casing 103 having a flexible wall 104, as of thin glass or metal, through which the movable contact arm 105 extends. Slight upward movement of arm 105 of switch LL or slight downward movement of arm 105 of switch HH is sufficient to effect engagement with the stationary contact 106 within the switch casing.

Preferably, as shown in Fig. 14, the movable contact arms of the two single-pole, single-throw switches are connected by springs 107 and block 108 to bias them to open-circuit position; the block 108 has two abutments 109, or equivalent, to receive the end of pivoted member 101. As arm 101 rocks in clockwise direction, for example, the tension of the upper spring 107 is relieved to permit closure of switch LL which remains closed until upward movement of block 102 by motor M1 increases the tension of the upper spring 107 and effects separation of the contacts of switch LL.

As thus far described, the arrangement provides control action in accordance with rate of change of the controlled condition. To provide for deviation control, the arm 98 is provided with an extension 110 which carries the armature 111 of a motor M3 whose field core 112 is stationary. The field coil 113 is energized from any suitable source of alternating current and the field poles are provided with shading coils 114.

With the armature disk 111 in the position shown in Fig. 14, the two torques tending to effect rotation of the armature in opposite directions are equal and no rotation occurs. When, however, the frame 98 is moved up or down from the position shown, the torques become unbalanced and armature 111 rotates in one direction or the other depending upon the sense of displacement of frame 98. The permanent magnet 115 provides a damping torque substantially proportional to the speed of rotation of armature 111.

The worm 116 on the armature shaft engages worm wheel 117 secured to the shaft 118 supported by brackets 119 extending from extension 110 of frame 98. The pinion 120 on shaft 118 engages the rack 121 whose lower end is pivoted at 122 to the lever 99 pivotally mounted at 123 to the block 124 adjustably secured as by thumb-screw 125 to frame 98. The rack member 121 is guided for its linear movement by the member 126 extending from extension 110.

Accordingly, so long as frame 98 is displaced from its neutral position, the armature 111 rotates to effect, through rack 121, lever 99 and link 100, movement of the switch-actuating member 101 at a rate substantially proportional to the existing displacement of member 98 from its neutral position which displacement is representative of the existing deviation of the controlled condition from its normal or desired magnitude.

In the mechanism shown, the movement of cam 61 to arm 98 is transmitted by the linearly reciprocable member 127, guided by the fixed members 128, and the cam 129 pivoted at 130 to arm 98. The control point may be changed by adjusting cam 129 angularly about its pivot; specifically, the pulley 131 is connected, as by cord 132, to pulley 133 on shaft 134 manually adjustable by knob 135 which may be conveniently mounted on the front of the instrument. If desired, there may be provided a scale 136 along which is adjustable an index 137 connected as by cord 138 and pulley 139 to shaft 134 to afford an indication of the control point setting.

To adapt the apparatus for the different characteristics of systems with which it may be used, the ratios of the lever arms of members 99 and 101 are preferably adjustable as provided by adjustable block 124 associated with member 99 and adjustable blocks 140, 141 associated with member 101.

In the modification of Fig. 14 shown in Fig. 17, the intermediate member 127 is dispensed with, the cam 129a directly engaging the periphery of cam 61 which is at right angles thereto. Angular movement of cam 61 causes pivotal movement of arm 98a about its pivot 99a to effect operation of control devices as explained in connection with Figs. 14 to 16. To provide for change in setting of the control point, the shaft 142 is adapted to be angularly adjusted through gears 143, 144, the former being secured to shaft 142 and the latter, having its axis of rotation coincident with the pivotal axis of arm or frame member 98a, being suitably connected to the manually adjustable knob 135a associated with scale 136a.

Fig. 18 illustrates another modification of the apparatus shown in Fig. 14. Angular adjustment of shaft RCS effects linear movement of cam 61b through gear 145 secured to shaft RCS and rack 146 attached to cam 61b. To frame 98b, corresponding to frame 98 of Fig. 14, is adjustably secured cam 129b between whose edge and the edge of cam 61b is interposed the intermediate member 127. Accordingly, as cam 61b is moved to the right or left, the frame 98b is moved in clockwise or counterclockwise direction, respectively, to effect operation of control devices such as shown in Fig. 14.

By mounting frame 98b substantially parallel to shaft RCS, as indicated in Fig. 19, the intermediate member 127 of Fig. 18 may be dispensed with; the face or edge of cam 129b then directly engages the edge of cam 61b so that arm 98b is raised for movement of cam 61b to the left and is lowered for movement of cam 61b to the right.

Instead of using two single-pole single-throw switches, as shown in Fig. 14, to control the motor M1 and CM, there may be utilized a single-pole double-throw switch as shown in Fig. 20. To the external end of the movable contact arm 105a is attached a bracket 147; the opposite ends of the springs 107 are secured to the bracket and between the adjacent ends of the springs is connected the block 108 movable by the switch-actuating lever 101 of Fig. 14.

Figs. 21 and 22 illustrate mechanism utilizable in the apparatus of Fig. 14 in lieu of the motor M3. When arm 98 is in its neutral position, the internally threaded wheel 148 is at the center of the continuously revolving disk 149 and therefore does not rotate. When, however, arm 98 is raised or lowered, the wheel 148 is moved from the center of disk 149 and is rotated thereby in one direction or the other depending upon the direction of displacement of arm 98 and at a rate substantially proportional to the displacement.

Rotation of wheel 148 is, therefore, effective to raise or lower the threaded rod 121a, corresponding in purpose to rack member 121 of Fig. 14, to rock the lever 99 connected, as shown in Fig. 14, to the switch-actuating arm 101.

The direction of rotation of disk 149 is such that the control action resulting from rotation of wheel 148 is, of course, in proper sense to return the controlled condition to its desired or normal magnitude.

In the arrangement shown in Fig. 22a, instead of a single friction wheel 148, there are utilized two friction wheels 148a, 148b attached, respectively, to the ring gears 161, 162 of a differential. When frame 98 is in neutral position, the gears 148a, 148b turn at the same speed in opposite directions; hence the spider 163 carrying pinions 164 in engagement with gears 148a, 148b remains stationary. When, however, arm 98 is displaced from neutral position by cam 61 of Fig. 14, or equivalent, the wheels 148a, 148b are unequally distant from the center of disk 149 and, therefore, revolve at unequal speeds. Consequently, by differential action, the spider 163 rotates in one direction or the other depending upon the sense of displacement of arm 98 and since the sleeve 164 which carries the spider 163 is internally threaded the threaded shaft 121a is moved linearly to effect through linkage, the same as, or corresponding to that shown in Fig. 14, movement of the control member 101.

Fig. 23 discloses a pneumatic motor or turbine PM utilizable in the apparatus of Fig. 14 in replacement of the electric motor M3. The turbine rotor 111a is rotatably mounted on the extension 110 of the pivoted frame 98 and is connected to lever 99 through gearing 116, 117, 120 and rack member 121; the rotor casing 150 is suitably fastened to the extension 110.

When arm 98 is in neutral position, the inlet ports 151, 152 communicating, respectively, with the discharge ports 153, 154 adjacent the rotor, receive the same amount of motive fluid from the ports 155, 156 and consequently no rotation of rotor 111a occurs. When arm 98 moves up or down from the position shown, the amount of motive fluid received by one of the ports 151, 152 increases with concurrent decrease by barrier 160 of the supply to the other of them; consequently, the rotor 111a revolves in one direction or the other depending upon the sense of displacement of frame 98.

Any suitable source may be connected to supply motive fluid to ports 155, 156; in the particular arrangement shown, a cam 157 constantly driven, as by the motor M of the recorder mechanism, operates the bellows-type pump 158 whose interior is in communication with the ports 155, 156.

If, for any reason, the current to the field coil of motor M3, Fig. 14, or the motive fluid for turbine PM, is interrupted, the mechanism will afford rate-of-change control action. If only such action is desired, the apparatus may be simplified as shown in Fig. 24 by omission of motor M3 or its equivalent, in which case the link 100 may be directly connected to the frame 98 or to the block 124 adjustable thereon.

The control device operated by arm 101 of any of the modifications of Figs. 14 to 24 is suited to the nature of the motor or motors to be controlled; it need not be electric-switch mechanism; it may be a pilot valve similar to the valve mechanism CC3 of Fig. 7, or C3C of Fig. 8.

It is characteristic of all modifications disclosed that the control action does not affect the measuring network, or equivalent primary responsive means, except insofar as they affect the magnitude of the controlled condition; hence the position of the indicator or recorder marker at all times corresponds to the existing magnitude of the condition.

While preferred forms of our invention have been illustrated and described, it is to be understood the invention is not limited thereto but is coextensive in scope with the appended claims.

What we claim is:

1. The method of controlling the magnitude of a condition which comprises adjusting a control element so that its position at all times substantially corresponds to the then existing magnitude of the condition, producing a control effect whose sense is determined by the sense of deviation of said element from its neutral position and whose magnitude is a function of the magnitude of the deviation, producing a second control effect whose sense corresponds with and is derived from the adjustment of said element, and varying the application of an agent affecting the rate of magnitude of said condition in accordance with the resultant of said control effects.

2. The method of controlling the magnitude of a condition which comprises adjusting an element in a sense corresponding to the sense of the rate of change of said condition, deriving from the adjusted element a control effect in accordance with said adjustment, producing a second control effect in accordance with the deviation of said element from its neutral position, producing a third control effect representative of the position of a member controlling the application of an agent affecting the magnitude of said condition, and adjusting the position of said member in accordance with the relative magnitudes of said control effects.

3. The method of controlling the magnitude of a condition which comprises adjusting the position of an element at a rate corresponding to the rate of change of the condition so that its deviation from a neutral position at all times substantially corresponds to the existing departure of the magnitude of the condition from the desired magnitude thereof, producing, so long as there is deviation of said element from its neutral position, a control effect varying as a function of the deviation of said element from neutral position, producing a control effect in accordance with the rate of adjustment of said element, producing a third control effect in accordance with the position of a member controlling the rate of application of an agent controlling the magnitude of said condition, and changing the position of said member in accordance with the relative magnitudes of said control effects.

4. The method of controlling the magnitude of a condition which comprises positioning a control element in accordance with the existing magnitude of the condition, varying the position of a second control element at a rate corresponding to the deviation of said condition from a desired magnitude, and varying the rate of application of an agent controlling the magnitude of said condition in accordance with the relative position of said elements.

5. A control system comprising means for displacing a control element from its neutral position in accordance with the existing departure of the magnitude of a condition from the desired magnitude, means for adjusting a second control element at a rate varying as a function of said departure, control structure adjustable to vary the application of an agent affecting the magnitude of said condition, and means for effecting adjustment of said control structure at a rate in accordance with the relative positions of said control elements.

6. A control system comprising relatively movable control elements whose relative positions determine the magnitude of a control effect, means for positioning one of said elements in accordance with the magnitude of a condition, means for adjusting another of said control elements at a rate related to departure of the magnitude of said condition from a predetermined magnitude, a member adjustable to vary the rate of application of an agent controlling the magnitude of said condition, means for producing a control effect of magnitude dependent upon the position of said member, and means for adjusting said member in accordance with the resultant of said effects.

7. An arrangement for controlling the magnitude of a condition comprising a normally balanced system including means for unbalancing it upon change in magnitude of said condition, means responsive to unbalance of said system to effect adjustment of an element to restore balance at the existing magnitude of said condition, a second normally balanced system unbalanced by the rebalancing operation of said responsive means, means for regulating the application of an agent affecting the magnitude of said condition, operating means for said regulating means responsive to unbalance of said second system, and means responsive to the deviation of said element from a position corresponding to the desired magnitude of said condition for effecting additional unbalance of said second system.

8. An arrangement for controlling the magnitude of a condition comprising a normally balanced system, means for unbalancing it upon change in magnitude of said condition, means responsive to unbalance of said system to effect adjustment of an element to restore balance at the existing magnitude of said condition and at a rate varying as a function of the extent of unbalance, a second normally balanced system unbalanced by and in accordance with the adjustment of said element, means responsive to the deviation of said element from neutral position for unbalancing said second system at a rate dependent upon the deviation of said element, a member adjustable to vary the rate of application of an agent controlling the magnitude of said condition, and operative means for said member responsive to unbalance of said second normally balanced system.

9. A system for controlling the magnitude of a condition comprising a normally balanced network including means for unbalancing it upon change in magnitude of said condition, means responsive to unbalance of said network to effect rebalance thereof at the existing magnitude of the condition by varying the position of an impedance-varying element of said network, a second normally balanced network unbalanced by the rebalancing operation of said responsive means at a rate varying as a function of the rate of change of said condition, means for regulating the application of an agent affecting the magnitude of said condition, operating means for said regulating means responsive to unbalance of said second network to effect rebalance thereof, and means responsive to the deviation of said element from a position corresponding to the desired magnitude of said condition for effecting additional unbalance of said second network at a rate dependent upon said deviation.

10. A system comprising a member deflecting in accordance with the change in magnitude of a condition, an element so adjusted in response to deflections of said member that its position from a neutral position substantially corresponds to the existing deviation of the magnitude of said condition from the desired magnitude, means for varying a control effect by the adjustment of said element, means for varying a control effect at a rate dependent upon the deviation of said member from its neutral position, and control means for varying the application of an agent affecting the magnitude of said condition in accordance with the resultant of said control effects.

11. Control apparatus comprising a member whose deviation from a neutral position substantially continuously corresponds to the existing departure of the magnitude of a condition from the desired magnitude thereof, control structure mechanically connected to said member for movement therewith, and mechanism carried by said member and operating to effect adjustment of said control structure so long as there is departure of said member from its neutral position.

12. Control apparatus comprising a system unbalanced by change in magnitude of a condition, means responsive to unbalance of said system to effect rebalance thereof at the existing magnitude of said condition, a member adjusted by said responsive means so that its deviation from its neutral position at all times substantially corresponds to the departure of the magnitude of the condition from the desired magnitude thereof, control structure movable by said member, and mechanism carried by said member and operating so long as said member is displaced from its neutral position to effect adjustment of said control structure.

13. Control apparatus comprising a system unbalanced by change in magnitude of a condition, means responsive to unbalance of said system to effect rebalance thereof at the existing magnitude of the condition, a member movable by said responsive means so that its deviation from a neutral position at all times substantially corresponds to departure of the magnitude of a condition from the desired magnitude thereof, control structure movable in response to movement of said member, a rotatable element carried by said member and operatively connected to said control structure, and means for effecting rotation of said element at a rate varying as a function of the displacement of said member from neutral position.

14. Control apparatus comprising a member adjusted periodically in response to changes in magnitude of a condition so that its deviation from a neutral position at all times substantially corresponds to the deviation of the existing magnitude of the condition from the desired magnitude thereof, control structure movable in response to movement of said member, a rotatable element carried by said member and operatively connected to said control structure, and means for effecting rotation of said element so long as said member is displaced from its neutral position.

15. Control apparatus comprising a source of power, a driving element, a driven element, means for periodically effecting engagement of said elements, means responsive to changes in magnitude of a condition for displacing said driving element for operation by said source of power, a member movable by said driven element from a neutral position in response to departure of the magnitude of a condition from the desired magnitude thereof, control structure movable in response to movement of said member, a rotatable element carried by said member and operatively connected to said control structure, and means for effecting rotation of said element in a sense corresponding to the displacement of said member from neutral position and at a rate which is a function of the displacement of said member from its neutral position.

16. Control apparatus comprising a source of power, a driving element, a driven element, means for periodically effecting engagement of said elements, means responsive to changes in magnitude of a condition for displacing said driving element for operation by said source of power, a member adjusted by said driven element so that its deviation from a neutral position at all times substantially corresponds to the deviation of the existing magnitude of the condition from the desired magnitude thereof, control structure movable in response to movement of said member, a rotatable element carried by said member and operatively connected to said control structure, and means for effecting rotation of said rotatable element in a sense corresponding to the deviation of said member from its neutral position and at a rate which is a function of said deviation.

17. A system for controlling and recording the magnitude of a condition comprising a normally balanced network including means for unbalancing it upon change in magnitude of said condition, means responsive to unbalance of said network to effect rebalance thereof at the existing magnitude of the condition by varying the position of an impedance-varying element of said network, a second normally balanced network unbalanced by the rebalancing operation of said responsive means in accordance with the sense of the rate of change of said condition, means for regulating the application of an agent affecting the magnitude of said condition, operating means for said regulating means responsive to unbalance of said second network to effect rebalance thereof, means responsive to the deviation of said element from a position corresponding to the desired magnitude of said condition for effecting unbalance of said second network, and exhibiting means adjustable with said element.

18. Recorder-controller apparatus comprising a member deflecting in accordance with the changes in magnitude of a condition, a second member intermittently adjusted in response to deflections of said first member so that its deviation from its neutral position at all times substantially corresponds to the existing magnitude of the condition, control structure movable by said second member, mechanism carried by said second member and operating so long as said second member is displaced from its neutral position to effect adjustment of said control structure, and exhibiting means adjustable with said second member.

19. A system comprising means responsive to the changes in magnitude of a condition, a member adjustable to vary the magnitude of said condition, means comprising a mechanical relay controlled by said responsive means to position an element in accordance with the existing magnitude of said condition, and means for operating said member at a rate varying as a function of the deviation of said element from a neutral position and the rate of change of position of said element.

20. A control attachment for a recorder of the type utilizing a mechanical relay to effect rebalancing adjustment of an element included in a normally balanced system comprising a control member movable in unison with said element, a second control member movable relative to said first control member, and means for moving said second control member at a rate which is a function of the deviation of said element from a neutral position.

IRVING M. STEIN.
JACOB C. PETERS, JR.

CERTIFICATE OF CORRECTION.

Patent No. 2,119,061.  May 31, 1938.

IRVING M. STEIN, ET AL.

It is hereby certified that error appears in the printed specification of the above numbered patent requiring correction as follows: Page 11, first column, line 50, claim 1, strike out the words "rate of" and insert the same after "the" in line 49; and that the said Letters Patent should be read with this correction therein that the same may conform to the record of the case in the Patent Office.

Signed and sealed this 19th day of July, A. D. 1938.

Henry Van Arsdale,
(Seal)   Acting Commissioner of Patents.

DISCLAIMER 2,119,061.—*Irving M. Stein* and *Jacob C. Peters, Jr.*, Philadelphia, Pa. CONTROL METHOD AND APPARATUS. Patent dated May 31, 1938. Disclaimer filed May 5, 1939, by the assignee, *Leeds and Northrup Company*.

Hereby makes and enters this disclaimer to the subject matter of each of claims 1, 2, and 3 of said Letters Patent.

[*Official Gazette May 23, 1939.*]

DISCLAIMER 2,119,061.—*Irving M. Stein* and *Jacob C. Peters, Jr.*, Philadelphia, Pa. CONTROL METHOD AND APPARATUS. Patent dated May 31, 1938. Disclaimer filed January 22, 1940, by the assignee, *Leeds & Northrup Company*.

Hereby disclaims the subject matter of claims 4 and 6 of said Letters Patent; and disclaims from the subject matter and scope of claim 10 of said Letters Patent those systems of control which are not characterized by the fact that "a member deflecting in accordance with the change in magnitude of a condition," so identified in said claim, deflects from its neutral position regardless of the last prior magnitude of said condition; and which are not further characterized by the fact that "an element", first identified in aforesaid claim, is so adjusted after and in response to deflections of said member that its position from a neutral position, unrelated to aforesaid neutral position of said deflecting member, substantially corresponds to the existing deviation of the magnitude of said condition from the desired magnitude.

[*Official Gazette February 13, 1940.*]

CERTIFICATE OF CORRECTION.

Patent No. 2,119,061. May 31, 1938.

IRVING M. STEIN, ET AL.

It is hereby certified that error appears in the printed specification of the above numbered patent requiring correction as follows: Page 11, first column, line 50, claim 1, strike out the words "rate of" and insert the same after "the" in line 49; and that the said Letters Patent should be read with this correction therein that the same may conform to the record of the case in the Patent Office.

Signed and sealed this 19th day of July, A. D. 1938.

Henry Van Arsdale,
Acting Commissioner of Patents.

(Seal)

DISCLAIMER 2,119,061.—*Irving M. Stein* and *Jacob C. Peters, Jr.*, Philadelphia, Pa. CONTROL METHOD AND APPARATUS. Patent dated May 31, 1938. Disclaimer filed May 5, 1939, by the assignee, *Leeds and Northrup Company*.

Hereby makes and enters this disclaimer to the subject matter of each of claims 1, 2, and 3 of said Letters Patent.

[*Official Gazette May 23, 1939.*]

DISCLAIMER 2,119,061.—*Irving M. Stein* and *Jacob C. Peters, Jr.*, Philadelphia, Pa. CONTROL METHOD AND APPARATUS. Patent dated May 31, 1938. Disclaimer filed January 22, 1940, by the assignee, *Leeds & Northrup Company*.

Hereby disclaims the subject matter of claims 4 and 6 of said Letters Patent; and disclaims from the subject matter and scope of claim 10 of said Letters Patent those systems of control which are not characterized by the fact that "a member deflecting in accordance with the change in magnitude of a condition," so identified in said claim, deflects from its neutral position regardless of the last prior magnitude of said condition; and which are not further characterized by the fact that "an element", first identified in aforesaid claim, is so adjusted after and in response to deflections of said member that its position from a neutral position, unrelated to aforesaid neutral position of said deflecting member, substantially corresponds to the existing deviation of the magnitude of said condition from the desired magnitude.

[*Official Gazette February 13, 1940.*]

DISCLAIMER 2,119,061.—*Irving M. Stein* and *Jacob C. Peters, Jr.*, Philadelphia, Pa. CONTROL METHOD AND APPARATUS. Patent dated May 31, 1938. Disclaimer filed July 6, 1940, by the assignee, *Leeds & Northrup Company*.

Hereby disclaims claim 10 of the specification.

[*Official Gazette July 30, 1940.*]